(12) United States Patent
Nolan et al.

(10) Patent No.: US 9,644,121 B2
(45) Date of Patent: May 9, 2017

(54) ADHESIVES SUITABLE FOR USE IN BONDING APPLICATIONS

(71) Applicants: Henkel Ireland Limited, Monheim (DE); Henkel AG & Co. KGaA, Duesseldorf (DE)

(72) Inventors: Darren Nolan, Dublin (IE); Nigel Fay, Duesseldorf (DE); Eimear Fleming, Dublin (IE); Brendan Kneafsey, Dublin (IE); Rainer Wefringhaus, Hilden (DE); Wolfgang Weimar, Hanau (DE)

(73) Assignees: Henkel AG & Co. KGaA, Duesseldorf (DE); Henkel IP & Holding GmbH, Duesseldorf (DE)

( * ) Notice: Subject to any disclaimer, the term of this patent is extended or adjusted under 35 U.S.C. 154(b) by 805 days.

(21) Appl. No.: 13/796,633

(22) Filed: Mar. 12, 2013

(65) Prior Publication Data

US 2013/0189525 A1 Jul. 25, 2013

Related U.S. Application Data

(63) Continuation of application No. PCT/EP2011/056826, filed on Apr. 29, 2011.

(51) Int. Cl.
| | |
|---|---|
| *C09J 123/28* | (2006.01) |
| *C08K 5/54* | (2006.01) |
| *B32B 9/04* | (2006.01) |
| *C08K 5/5435* | (2006.01) |

(52) U.S. Cl.
CPC .......... *C09J 123/286* (2013.01); *B32B 9/041* (2013.01); *B32B 9/043* (2013.01); *C09J 123/28* (2013.01); *C08K 5/54* (2013.01); *C08K 5/5435* (2013.01); *C08K 2201/014* (2013.01); *Y10T 428/31515* (2015.04)

(58) Field of Classification Search
CPC ................ C09J 123/286; C09J 123/28; C08K 2201/014; C08K 5/54; C08K 5/5435; Y10T 428/31515; B32B 9/041; B32B 9/043

See application file for complete search history.

(56) References Cited

U.S. PATENT DOCUMENTS

| | | | | |
|---|---|---|---|---|
| 4,031,120 | A | 6/1977 | Gervase | |
| 4,725,506 | A * | 2/1988 | Nagano | C08F 8/20 428/412 |
| 4,863,992 | A * | 9/1989 | Wengrovius | C08G 77/18 524/188 |
| 6,645,339 | B1 * | 11/2003 | DeCato | C08K 5/544 156/329 |
| 7,560,157 | B2 | 7/2009 | Kasahara et al. | |
| 2006/0160943 | A1 | 7/2006 | Weir | |
| 2010/0222449 | A1 * | 9/2010 | Noda | C08K 5/0025 522/99 |
| 2010/0234502 | A1 | 9/2010 | Iwasaki et al. | |
| 2013/0029037 | A1 * | 1/2013 | Stanjek | C08G 65/336 427/140 |

FOREIGN PATENT DOCUMENTS

| | | |
|---|---|---|
| CN | 1678706 | 10/2005 |
| CN | 1817999 | 8/2006 |
| CN | 101851349 | 10/2010 |
| EP | 0478176 | 4/1992 |
| FR | 2637904 | 4/1990 |
| WO | 2004078867 | 9/2004 |

OTHER PUBLICATIONS

International Search Report issued in connection with International Patent Application No. PCT/EP2011/056826 mailed on Jun. 6, 2011.

\* cited by examiner

*Primary Examiner* — Kevin R Kruer
(74) *Attorney, Agent, or Firm* — Steven C. Bauman

(57) ABSTRACT

The present invention relates to adhesives that are suitable for use in a broad variety of bonding applications. In particular, the present invention relates to adhesives that are suitable for use in polymer-to-metal, for example elastomer-to-metal, such as rubber-to-metal bonding applications, wherein the adhesives comprise at least one halogenated polyolefin, at least one epoxysilane having at least one terminal alkoxy silane group, at least one bis-silane, and optionally at lease one organic solvent.

11 Claims, No Drawings

ADHESIVES SUITABLE FOR USE IN BONDING APPLICATIONS

The present invention relates to adhesives that are suitable for use in a broad variety of bonding applications. In particular, the present invention relates to adhesives that are suitable for use in polymer-to-metal, for example elastomer-to-metal, such as rubber-to-metal bonding applications.

Polymer to metal and in particular rubber to metal bonding has been practised for many years. There are many applications for formulations which achieve polymer or rubber to metal bonding. Rubber to metal bonding is widely used to bond different metals to a natural or synthetic rubber.

One aspect of rubber to metal bonding is to combine the structural strength of the metal with the elastomeric properties of the rubber.

Accordingly, metal and polymers such as rubber are often bonded to each other for impact absorption applications, such as in bearings, wheels, shock absorbers, moving arms, etc. Such components can be utilized on a very small scale, for example in computer components or on a very large scale for example in constructions such as bridges and buildings. Noise reduction may also be achieved by utilizing metal to rubber bonding. It is accepted that tremendous forces can be experienced by any component that comprises metal and rubber bonded together. Accordingly, it is desirable to provide metal to rubber bonding, which can withstand significant forces, such as compressive or extensive pressures including shocks without having the metal or the rubber separate from each other. There are many other rubber to metal bonding applications, including tyre production where internal wire reinforcements for the tyre are bonded to the rubber of the tyre.

Generally, an adhesive is provided to bond a selected elastomer to a selected metallic substrate.

Traditional elastomer-to-metal bonding technology incorporates a two-step system, where in a first step a primer is applied and thereafter in a second step an adhesive is applied. The primer ordinarily consists of solutions or suspensions of chlorinated rubber and phenolic resins containing reactive groups, and also pigments such as titanium dioxide, zinc oxide, carbon black, etc. The primer is generally applied as a thin layer onto a treated (cleaned) surface of a metallic substrate.

The adhesive ordinarily consists of a large range of rubber materials and cross-linkers. These include, but are not restricted to, chlorinated and bromochlorinated rubbers, aromatic nitrosobenzene compounds and bismaleimide as cross-linkers, xylene, perchloroethylene and ethylbenzene as solvents, and also some lead or zinc salts. The adhesive layer is generally the link between the primed metal and the rubber.

Common cross-linkers that have been employed in elastomer-to-metal bonding technology are aromatic nitroso compounds, such as p-dinitrosobenzene.

In the many fields where elastomer-to-metal bonding is employed there are numerous opportunities to address several types of problems, including bond strength and durability, sample preparation and ease of application of the adhesive, single coat versus two-coat systems, reduced toxicity and improved properties for the environment, amongst others.

Many formulations for polymer-to-metal bonding exist.

International patent application publication WO 2004/078867 to Lord Corporation describes a single coat solvent-based adhesive designed to bond thermoplastic elastomers containing an alkoxy silane/urethane adduct and a chlorinated polymer. Methods of synthesis and formulation are described within this document.

U.S. Pat. No. 4,031,120 to Lord Corporation describes a composition comprising an isocyanate functional organosilane, in combination with a polyisocyanate and an aromatic nitroso compound. The resulting system is described as a one-coat adhesive for bonding a variety of elastomeric materials to metals and other substrates.

Generally, it is desirable that bonding is achieved during a vulcanization step like compression molding, transfer molding, injection molding and autoclave heating, for example with steam or hot air. For example, semi-solid rubber can be injected into a mould. The semi-solid rubber is then cross-linked into a fully cured rubber and the bond with the substrate is formed at the same time.

Certain requirements of the curing system are desirable. This includes, ease of processing, stability (for example avoiding sedimentation), ease of application, fast drying (to allow handling without fouling), good wetting properties, and good curing strengths. Curing should be achieved independently of the type of elastomer (rubber) employed and also independently of the type of substrate. It will be appreciated that some rubbers are blended materials and accordingly it is desirable that good curing is achieved with such blended materials. Suitably consistent curing is achieved under various process parameters. Durability is also desirable. For example, the rubber/metal joint should be durable under relatively high mechanical stress for example under high pressure and even if exposed to an aggressive atmosphere, for example a hot liquid such as oil.

It should be noted that the bonding strength of the aforementioned adhesive compositions could vary depending on the chemical nature of the polymeric or elastomeric substrate. In particular most of the adhesives for polymer-to-metal bonding applications exhibit an insufficient bonding strength when used to bond polar elastomeric substrates, such as nitrile butadiene rubber (NBR), hydrogenated nitrile butadiene rubber (HNBR) and/or ethylene acrylic elastomers to metallic substrates.

In view of the potential adverse environmental effects posed by the presence of isocyanate-containing and/or nitroso-containing compounds, it would also be desirable to provide one-coat adhesives suitable for use in polymer-to-metal bonding applications, wherein said adhesives exhibit a good bonding strength without comprising significant amounts of isocyanate-containing and/or nitroso-containing compounds.

Thus, there still remains a need for new environmentally friendly adhesives that are effective for bonding polar elastomeric materials to different substrates.

The adhesive of the present invention may be used to bond polymeric substrates, such as elastomeric substrates to any of a wide variety of useful materials, including for example elastomers, non-elastomeric but flexible materials such as for example fabrics or films, and rigid materials such as plastics, engineering plastics, wood, glass and metal.

The adhesive of the present invention is in particular suitable for bonding polymeric substrates such as elastomeric substrates to metallic or glass substrates, wherein the adhesive is preferably used for bonding polar elastomeric materials, such as nitrile butadiene rubbers (NBR), hydrogenated nitrile butadiene rubbers (HNBR) and/or ethylene acrylic elastomers to metallic substrates.

The adhesive according to the present invention comprises
i) at least one halogenated polyolefin;

ii) at least one epoxysilane having at least one terminal alkoxy silane group;

iii) at least one bis-silane; and iv) optionally at least one organic solvent.

In another aspect the present invention relates to a process for bonding a first substrate to a second substrate, comprising the steps of:

a) providing an adhesive of the present invention;

b) applying the adhesive to at least one part of the surface of the first substrate; and c) contacting said surface of the first substrate with a surface of a second substrate, to which the adhesive is optionally applied, under conditions of heat and pressure sufficient to create an adhesive bond between the two substrates.

The invention also relates to the use of an inventive adhesive for bonding a first substrate to a second substrate, wherein one substrate is an elastomeric substrate.

Another aspect of the present invention relates to an article, comprising at least two substrates bound together by the cured product of the adhesive of the present invention.

The terms "elastomer", "elastomeric substrate" or "elastomeric material" are used interchangeably in the present invention. The terms preferably refer to a material that can undergo a substantial elongation and then returns to its approximately original dimensions upon release of the stress elongating the material. More preferably the elastomeric substrate has a permanent set of less than 50%, such as less than 30% or less than 10% after one minute when recovering from a strain of 100% applied for one minute at a temperature of 22° C.

In one embodiment the elastomer or elastomeric substrate is selected from natural or synthetic rubbers, wherein the adhesive of the present invention is in particular suitable for bonding polar rubbers, like nitrile butadiene rubbers (NBR), hydrogenated nitrile butadiene rubbers (HNBR) and/or ethylene acrylic elastomers to rigid substrates, such as metallic substrates.

The adhesive of the present invention is preferably a one-part adhesive, which means, that one or more epoxysilanes and one or more bis-silanes are mixed with one or more halogenated polyolefins, prior to use.

The aforementioned components are preferably mixed in the presence of at least one organic solvent of the present invention.

It is advantageous to formulate the adhesive of the present invention as a one-part system, because such systems are readily applied to substrates in a single step using conventional techniques, such as spraying, rolling or dipping.

The adhesive of the present invention is preferably storage-stable, which means that the adhesive formulation remains homogeneous, as determined by unenhanced visual inspection, when stored for a period of at least about 1 day at 22° C. in a sealed container.

The adhesive of the present invention comprises at least one halogenated polyolefin, which preferably acts as a film forming agent.

Halogenated polyolefins used in the adhesive of the present invention have structures that are the same as those of unsubstituted polyolefins except that at least one hydrogen atom of the polyolefin is replaced by a halogen atom. The halogen atom may be fluorine, chlorine, bromine, iodine, or a mixture thereof. The amount of halogen can preferably range from 5 to 95 percent by weight, more preferably from 55 to 90 percent by weight, each based on the total weight of the halogenated polyolefin.

The adhesive of the present invention exhibits a particularly good bonding strength and particularly good film forming characteristics when the weight average molecular weight (Mw) of the halogenated polyolefin is preferably in the range of 80000 g/mol to 600000 g/mol, more preferably in the range of 100000 g/mol to 500000 g/mol, and particularly preferably in the range of 200000 g/mol to 400000 g/mol.

In the present invention, the weight average molecular weight Mw of the halogenated polyolefin is preferably determined by gel permeation chromatography ("GPC") using polystyrene standards for calibration purposes.

The halogenated polyolefin can be a homopolymer or a copolymer of two or more different monomers. The halogenated polyolefin may comprises one or more alpha-olefins in polymerized form, wherein preferred alpha-olefins include C2-C20 alpha-olefins, like C2-C12 alpha-olefins, such as ethylene, propylene, butylene, hexene, octene, decene, dodecene, pentene, heptene, nonene, 4-methyl-pentene-1,3-methyl pentene-1,3,5,5-trimethyl-hexene-1, and 5-ethyl-1-nonene. Also included in the class of halogenated polyolefins are polymers based on natural rubber and polymers based on synthetic rubber such as for example polyisoprene, polybutadiene, polymers of adducts of butadiene and cyclic conjugated dienes, copolymers of butadiene and styrene, copolymers of acrylonitrile and butadiene, and the various copolymers thereof.

Suitable halogenated polyolefins include brominated polyolefins, chlorinated polyolefins, and mixed-halogen substituted polyolefins comprising two or more different types of halogen atoms, such as bromine and chlorine.

The bonding properties and stability of the adhesive of the present invention can be improved when the halogenated polyolefin is selected from chlorinated polyolefins or its derivatives. The term "chlorinated polyolefin", as used in the present invention, refers to olefinic polymers, in which at least one hydrogen atom is replaced by a chlorine atom.

Chlorinated polyolefins having a chlorine content of at least 40 percent by weight may be employed in order to further improve the bonding properties of the inventive adhesive, wherein it is desirable that the chlorine content ranges from 55 to 90 percent by weight, more preferably from 60 to 80 percent by weight, and particularly preferably from 65 to 75 percent by weight, each based on the total amount of the chlorinated polyolefin.

It is advantageous to use chlorinated polyolefins having the aforementioned chlorine content in the adhesives of the present invention, because the resulting adhesives exhibit a particularly good performance when used to bond polar elastomeric substrates, such as nitrile butadiene rubber (NBR), hydrogenated nitrile butadiene rubber (HNBR) and/or ethylene acrylic elastomers to metallic substrates.

The weight average molecular weight (Mw) of the chlorinated polyolefins is preferably in the range of 80000 g/mol to 600000 g/mol, more preferably in the range of 100000 g/mol to 500000 g/mol, and particularly preferably in the range of 200000 g/mol to 400000 g/mol, wherein the weight average molecular weight is determined as described above.

Suitable chlorinated polyolefins include chlorinated copolymers of propylene and/or ethylene, which could comprise additional comonomers, such as 1-butene, 1-pentene, 1-hexene, 1-heptene, or 1-octene.

Representative derivatives of chlorinated polyolefins include polymers comprising propylene- and/or ethylene-based repeating units which are graft-functionalized by unsaturated anhydrides, such as maleic anhydride, or which are modified by incorporating one or more ethylenic unsaturated monomers, e.g. acrylate or methacrylate monomers, macromonomers, vinyl-functional organosilanes, and/or liquid terminal ethylenic polydiene polymers.

In a particular preferred embodiment the chlorinated polyolefin is a chlorinated polypropylene homopolymer or a chlorinated polyethylene homopolymer.

Chlorinated polyolefins are known in the art and are commercially available form various companies, including Nippon Paper, Tokyo, Japan, under the designation Superchlon; Eastman Chemical Company, Kingsport, Tenn. under the designation CPO; and Toyo Kasei Kogyo Company, Ltd., Osaka, Japan under the designation Hardlen.

In an alternative embodiment of the present invention the halogenated polyolefin is selected from halosulfonated polyolefins. The term "halosulfonated polyolefins", as used in the present invention, refers to polymers in which some hydrogen atoms are replaced by halogen atoms and in which some other hydrogen atoms are replaced by sulfonyl halide groups, which have the chemical formula S02X, where X is a halogen atom.

The adhesive of the present invention can comprise any mixture or combination of the aforementioned halogenated polyolefins. One or more halogenated polyolefins may be present in the inventive adhesive to provide adequate film properties in an amount in the range of 1 to 30 wt.-%, more preferably in an amount of 3 to 20 wt.-%, and particularly preferably in an amount of 7 to 15 wt.-%, each based on the total weight of the adhesive of the present invention.

If the halogenated polyolefin is selected from chlorinated polyolefins, it is preferred that the chlorinated polyolefin is present in an amount in the range of about 1 to about 30 percent by weight, more preferably in an amount of about 3 to about 20 percent by weight, and particularly preferably in an amount of about 7 to about 15 percent by weight, each based on the total weight of the adhesive of the present invention.

The adhesive of the present invention further comprises at least one epoxysilane having at least one terminal alkoxy silane group (hereinafter referred to as epoxysilane).

The use of epoxysilanes in the adhesive of the present invention is essential, because the utilization of other epoxy resins, such as epoxy resins having no terminal alkoxy silane group, may lead to a significant decrease in the bonding performance of the resulting adhesive, especially in regard to heat aging and post-curing of the formed bond.

The term "epoxysilane", as used herein, refers to a compound having at least one epoxy group and at least one terminal alkoxy silane group per molecule. Desirably, the epoxysilanes contemplated for use in the adhesive of the present invention are selected from compounds having a single epoxy group and a single terminal alkoxy silane group per molecule.

The term "terminal alkoxy silane group", as used herein, refers to a functional group at one end of the molecule, wherein said functional group comprises exactly one silicon atom, wherein at least one alkoxy residue is bound to the silicon atom of the terminal alkoxy silane group. It may be appreciated that the epoxysilane may also be bound to a carrier material, such as a silica carrier.

In one embodiment of the present invention the terminal alkoxy silane group of the epoxysilane is represented by formula

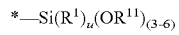

wherein u is 0, 1 or 2, each $R^1$ is independently selected from hydrogen, halogen, alkyl, cycloalkyl, alkenyl, aryl or acyl and each $R^{11}$ is independently selected from alkyl, cycloalkyl, alkenyl, aryl or acyl. In a particular preferred embodiment u is 0 and $R^{11}$ is selected from alkyl, wherein preferred alkyl groups include methyl, ethyl, n-propyl and iso-propyl.

Suitable terminal alkoxy silane groups include trimethoxysilane, triethoxysilane, tri-n-propoxysilane and/or tri-iso-propoxysilane groups.

To enhance the bonding properties of the adhesive of the present invention, it is advantageous that the epoxysilane, which is used in the adhesive of the present invention, is a non-polymeric compound, which means that the molecular weight of said epoxysilane is preferably less than 1000 g/mol, more preferably less than 750 g/mol, and particularly preferably less than 500 g/mol.

The epoxysilane contemplated for use in the practice of the present invention may be a monosilane. The term "monosilane", as used herein, refers to silane compounds having exactly one silicon atom per molecule, wherein monosilanes are preferred where three alkoxy residues are bound to the silicon atom.

Suitable epoxysilanes may be represented by formula (I),

formula (I)

wherein $R^a$ is a divalent linkage group, comprising 1 to 24, preferably 2 to 20 and more preferably 3 to 10 carbon atoms, $R^1$ and $R^3$ independently of one another are selected from $C_{1-24}$ alkyl, such as $C_{1-5}$ alkyl, $C_{2-24}$ alkenyl, $C_{1-24}$ alkoxyl or $C_{3-24}$ acyl, and $R^2$ is selected from $C_{1-24}$ alkyl, such as $C_{1-5}$ alkyl or $C_{3-24}$ acyl, and A is either

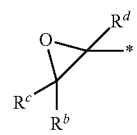

where $R^b$, $R^c$ and $R^d$ independently of one another are hydrogen or $C_{1-6}$ alkyl; or

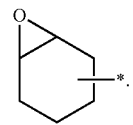

desirably $R^b$, $R^c$ and $R^d$ are hydrogen.

The divalent linkage group $R^a$ can be a straight or branched alkylene group of 1 to 24, preferably of 2 to 20 and more preferably of 3 to 10 carbon atoms. Said alkylene group may be interrupted by at least one heteroatom, preferably selected from oxygen, sulfur or nitrogen.

It is further on preferred that $R^1$ and $R^3$ of formula (I) independently of one another are selected from $C_{1-5}$ alkoxyl, such as methoxy, ethoxy, n-propoxy or iso-propoxy, and/or $R^2$ of formula (I) is $C_{1-5}$ alkyl, such methyl, ethyl, n-propyl or iso-propyl. More preferably $R^1$ and $R^3$ of formula (I) are both selected from methoxy, ethoxy, n-propoxy or iso-propoxy and $R^2$ of formula (I) is methyl, ethyl, n-propyl or iso-propyl.

Particularly preferred epoxysilanes are represented by formula (II),

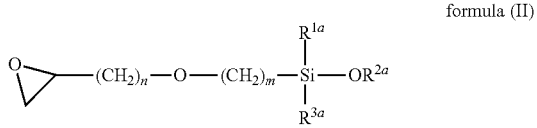

formula (II)

wherein n is an integer from 1 to 10, m is an integer from 0 to 14, $R^{1a}$ and $R^{3a}$ independently of one another are selected from $C_{1-24}$ alkyl, such as $C_{1-5}$ alkyl, $C_{2-24}$ alkenyl, $C_{1-24}$ alkoxyl or $C_{3-24}$ acyl, and $R^{2a}$ is selected from $C_{1-24}$ alkyl, such as $C_{1-5}$ alkyl or $C_{3-24}$ acyl. Desirably, n is 1, 2 or 3 and/or m is 2, 3 or 4, wherein it is particularly preferred that n is 1 and m is 3.

It is further on preferred that R1a and R3a of formula (II) independently of one another are selected from $C_{1-5}$ alkoxyl, such as methoxy, ethoxy, n-propoxy or iso-propoxy, and/or $R^{2a}$ of formula (II) is $C_{1-5}$ alkyl, such methyl, ethyl, n-propyl or iso-propyl. More preferably $R^{1a}$ and $R^{3a}$ of formula (II) are both selected from methoxy, ethoxy, n-propoxy or iso-propoxy and $R^2$ of formulae (II) is methyl, ethyl, n-propyl or iso-propyl.

Other particularly preferred epoxysilane contemplated for use in the practice of the present invention are represented by formula (IIa),

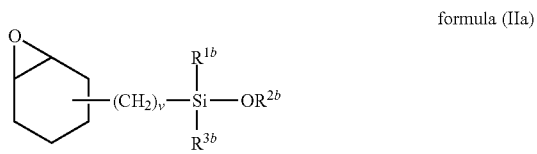

formula (IIa)

wherein v is an integer from 1 to 10, $R^{1b}$ and $R^{3b}$ independently of one another are selected from $C_{1-24}$ alkyl, such as $C_{1-5}$ alkyl, $C_{2-24}$ alkenyl, $C_{1-24}$ alkoxyl, such as $C_{1-5}$ alkoxyl or $C_{3-24}$ acyl, and $R^{2b}$ is selected from $C_{1-24}$ alkyl, such as or $C_{3-24}$ acyl. Desirably, v is 1, 2 or 3.

It is further on preferred that $R^{1b}$ and $R^{3b}$ of formula (IIa) independently of one another are selected from $C_{1-5}$ alkoxyl, such as methoxy, ethoxy, n-propoxy or iso-propoxy, and/or $R^{2b}$ of formula (IIa) is $C_{1-5}$ alkyl, such methyl, ethyl, n-propyl or iso-propyl. More preferably $R^{1b}$ and $R^{3b}$ of formula (IIa) are both selected from methoxy, ethoxy, n-propoxy or iso-propoxy and $R^2$ of formulae (IIa) is methyl, ethyl, n-propyl or iso-propyl.

In one embodiment of the present invention the epoxysilane is selected from 3-glycidyloxypropyltrimethoxysilane (GLYMO), 3-glycidyloxypropyltriethoxysilane (GLYEO), 3-glycidyloxypropyltri-n-propoxysilane, 3-glycidyloxypropyltri-iso-propoxysilane, 3-glycidyloxypropyltri-n-butoxysilane, 3-glycidyloxypropyltri-iso-butoxysilane, beta-(3,4-epoxycyclohexyl)-ethyltrimethoxysilane, beta-(3,4-epoxycyclohexyl)-ethyltriethoxysilane, beta-(3,4-epoxycyclohexyl)-ethyltri-n-propoxysilane, beta-(3,4-epoxycyclohexyl)-ethyltri-iso-propoxysilane, gamma-(3,4-epoxycyclohexyl)-propyltrimethoxysilane, gamma-(3,4-epoxycyclohexyl)-propyltriethoxysilane, gamma-(3,4-epoxycyclohexyl)-propyltri-n-propoxysilane, gamma-(3,4-epoxycyclohexyl)-propyltri-iso-propoxysilane and/or combinations thereof.

The aforementioned epoxysilanes are known in the art and are commercially available from various companies, including Evonik Industries AG, Wacker Chemie AG, Shin-Etsu Chemical and Gelest Inc.

A single epoxysilane or a mixture of two or more epoxysilanes can be used in the adhesive of the present invention.

To ensure sufficient adhesion to the substrate, especially to metal substrates, it is desirable that one or more epoxysilanes are present in an amount of 0.2 to 5 wt.-%, preferably in an amount of 0.5 to 2 wt.-%, and more preferably in an amount of 0.75 to 1.25 wt.-%, each based on the total amount of the adhesive of the present invention.

The adhesive of the present invention further comprises at least one bis-silane. The term "bis-silane", as used herein, refers to silane compounds having exactly two silicon atoms per molecule, wherein the two silicon atoms are linked with each other by a divalent linkage group and each silicon atom carries three additional substituents, wherein at least one of the three additional substituents is an alkyl or alkoxy residue.

Consequently, the bis-silane used in the adhesive of the present invention comprises two terminal organo-silyl groups. Under the proviso that the bis-silane contemplated for use in the adhesive of the present invention comprises at least one terminal alkoxy silane group, as defined above, said bis-silane does not comprise at least one epoxy group.

In one embodiment of the present invention the terminal organo-silyl group of the bis-silane is represented by formula

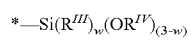

wherein w is 0, 1, 2 or 3, preferably w is 3, each $R^{III}$ is independently selected from hydrogen, halogen, alkyl, cycloalkyl, alkenyl, aryl or acyl and each $R^{IV}$ is independently selected from alkyl, cycloalkyl, alkenyl, aryl or acyl. In a particular preferred embodiment w is 0 and $R^{IV}$ is selected from alkyl, wherein preferred alkyl groups include methyl, ethyl, n-propyl and iso-propyl.

To enhance the bonding properties of the adhesive of the present invention, it is advantageous that the bis-silane, which is used in the adhesive of the present invention, is a non-polymeric compound, which means that the molecular weight of said bis-silane is preferably less than 1000 g/mol, more preferably less than 750 g/mol, and particularly preferably less than 500 g/mol.

Suitable bis-silanes contemplated for use in the adhesive of the present invention may be represented by formula (III),

formula (III)

wherein p is 0 to 3, q is 0 to 3, B represents a divalent linkage group comprising 1 to 24 carbon atoms and at least one heteroatom selected from N, S or O, each $R^4$ and each $R^6$ is independently selected from hydrogen, halogen, $C_{1-24}$ alkyl, $C_{2-24}$ alkenyl, $C_{1-24}$ alkoxyl or $C_{3-24}$ acyl, and each $R^5$ and each $R^7$ is independently selected $C_{1-24}$ alkyl or $C_{3-24}$ acyl.

Particular good bonding and drying properties are achieved, when the divalent linkage group B of formula (III) comprises one of the following structural elements:

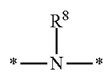

where $R^8$ is selected from hydrogen, $C_{1-24}$ alkyl, such as $C_{1-4}$ alkyl, or $C_{6-18}$ aryl;

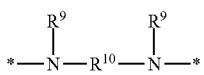

where each $R^9$ is independently selected from hydrogen, $C_{1-24}$ alkyl, such as $C_{1-4}$ alkyl, or $C_{6-18}$ aryl and $R^{10}$ is selected from $C_{1-24}$ alkylene or $C_{6-18}$ arylene; or

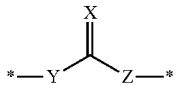

where Y is selected from O, S, and —$NR^{11}$—, Z is selected from O, S, and —$NR^{12}$—, wherein $R^{11}$ and $R^{12}$ independently of one another are selected from hydrogen or $C_{1-24}$ alkyl, such as $C_{1-4}$ alkyl, or $C_{6-18}$ aryl; X is the selected from O or S, with the proviso that Y and Z are not both O or S. Preferably Y is NH, Z is NH and X is O.

In an alternative embodiment the divalent linkage group B of formula (III) comprises the following structural element:

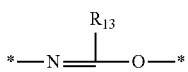

where $R^{13}$ is selected from $C_{1-24}$ alkyl, such as $C_{1-24}$ alkyl.

Preferred bis-silanes include those having two trisubstituted silyl groups. The substituents may individually be chosen from $C_{1-24}$ alkoxy, $C_{6-18}$ aryloxy and $C_{2-24}$ acyloxy.

Suitable bis-silanes for use within the present invention include those of formula (IV),

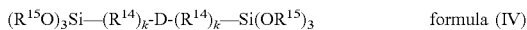

where k is 0 or 1, each $R^{15}$ is independently selected from $C_{1-4}$ alkyl or $C_{1-4}$ acyl and each $R^{14}$ is independently selected from $C_{1-6}$ alkylene or $C_{6-12}$ arylene, and D is selected from one of the following divalent groups:

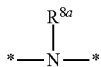

where $R^{8a}$ is selected from hydrogen, $C_{1-24}$ alkyl, such as $C_{1-4}$ alkyl, or $C_{6-18}$ aryl;

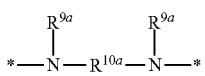

where each $R^{9a}$ is independently selected from hydrogen, $C_{1-24}$ alkyl, such as $C_{1-4}$ alkyl, or $C_{6-18}$ aryl and $R^{10a}$ is selected from $C_{1-24}$ alkylene or $C_{6-18}$ arylene;

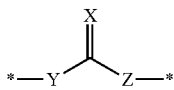

where Y is selected from O, S, and —$NR^{11a}$, Z is selected from O, S, and wherein $R^{11a}$ and $R^{12a}$ independently of one another are selected from hydrogen or $C_{1-24}$ alkyl, or $C_{6-18}$ aryl, and X is the selected from O or S, with the proviso that Y and Z are not both O or S. Preferably Y is NH, Z is NH and X is O.

Examples of suitable bis-silanes for use within the adhesives of the present invention include:

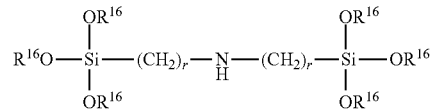

where r is from 1 to 10, such as from 1 to 4 and $R^{16}$ is selected from $C_{1-4}$ alkyl or $C_{1-4}$ acyl, and/or

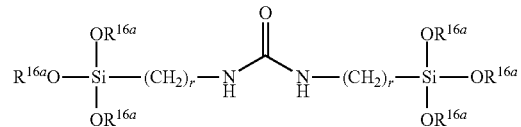

where r is from 1 to 10, such as from 1 to 4 and $R^{16a}$ is selected from $C_{1-4}$ alkyl or $C_{1-4}$ acyl.

In one embodiment of the present invention the bis-silane is selected from bis-(trimethoxysilylethyl)amine, bis-(triethoxysilylethyl)amine, bis-(tri-n-propoxysilylethyl)amine, bis-(tri-iso-propoxysilylethyl)amine, bis-(trimethoxysilylpropyl)amine, bis-(triethoxysilylpropyl)amine, bis-(tri-n-propoxysilylpropyl)amine, bis-(tri-iso-propoxysilylpropyl) amine, bis-(trimethoxysilylethyl)urea, bis-(triethoxysilylethyl)urea, bis-(tri-n-propoxysilylethyl)urea, bis-(tri-iso-propoxysilylethyl)urea, bis-(trimethoxysilylpropyl)urea, bis-(triethoxysilylpropyl)urea, bis-(tri-n-propoxysilylpropyl)urea, bis-(tri-iso-propoxysilylpropyl) urea, and/or combinations thereof. Preferably, bis-(trimethoxysilylpropyl)urea and/or bis-(trimethoxysilylpropyl)amine are used in the present invention, although other bis-silanes may also be used.

Other desirable bis-silanes include N,0-bis(trimethylsilyl)acetamide N,0-bis(triethylsilyl)acetamide, 1,3-bis(trimethylsilyl)urea, 1,3-bis(triethylsilyl)urea, 1,3-bis(trimethylsilyl)thiourea, 1,3-bis(triethylsilyl)thiourea, and/or mixtures thereof.

The aforementioned bis-silanes are known in the art and are commercially available form various companies, including Evonik Industries AG, Wacker Chemie AG, Shin-Etsu Chemical and Gelest Inc.

A single bis-silane or a mixture of two or more bis-silanes can be used in the adhesive of the present invention.

It is desirable that one or more bis-silanes are present in an amount of 0.1 to 2 wt.-%, preferably in an amount of 0.15 to 1 wt.-%, and more preferably in an amount of 0.2 to 0.4 wt.-%, each based on the total amount of the adhesive of the present invention.

By using a combination of the aforementioned halogenated polyolefins, epoxysilanes and bis-silanes in the adhesives of the present invention the elastomer-to-metal bonding properties of the inventive adhesives are significantly improved over comparable adhesive formulation of the prior art, which do not comprise such a synergistic combination. In addition, the coating properties of the adhesive of the present invention are improved over comparable adhesive formulation of the prior art. Conventional adhesives normally require a drying time at elevated temperatures after being applied to substrates, such as metallic substrates. In contrast to that, the adhesives of the present invention can be dried at 22° C. in short time periods and the resulting coating is hard and non-tacky. Therefore, it is possible to pre-coat and store different substrates, such as metallic substrates and to directly use these pre-coated substrates later on in bonding operations.

The adhesive of the present invention may advantageously comprise one or more of the aforementioned epoxysilanes in an amount of 0.2 to 5 wt.-%, preferably in an amount of 0.5 to 2 wt.-%, and particularly preferably in an amount of 0.75 to 1.25 wt.-% and one or more of the aforementioned bis-silanes in an amount of 0.1 to 2 wt.-%, preferably in an amount of 0.15 to 1 wt.-%, and particularly preferably in an amount of 0.2 to 0.4 wt.-%, wherein each amount is based on the total amount of the adhesive of the present invention.

A particular durable elastomer to metal bond is formed by the cured product of the adhesive of the present invention, when said adhesive comprises the epoxysilane and the bis-silane in a weight ratio of 1:0.2 to 1:0.8, preferably in a weight ration of 1:0.3 to 1:0.7.

The weight ratio of epoxysilane to the bis-silane, as used herein, refers to weight ratio of the total amount of all epoxysilanes to the total amount of all bis-silanes present in the adhesive of the present invention.

The bonding performance of the adhesive of the present invention can further be improved by using the following combinations of epoxysilanes and bis-silanes:
3-glycidyloxypropyltrimethoxysilane and bis-(trimethoxysilylpropyl)amine;
3-glycidyloxypropyltrimethoxysilane and bis-(trimethoxysilylpropyl)urea;
3-glycidyloxypropyltriethoxysilane and bis-(trimethoxysilylpropyl)amine;
3-glycidyloxypropyltriethoxysilane and bis-(trimethoxysilylpropyl)urea;
3-glycidyloxypropyltri-n-propoxysilane and bis-(trimethoxysilylpropyl)amine;
3-glycidyloxypropyltri-n-propoxysilane and bis-(trimethoxysilylpropyl)urea;
3-glycidyloxypropyltri-iso-propoxysilane and bis-(trimethoxysilylpropyl)amine;
3-glycidyloxypropyltri-iso-propoxysilane and bis-(trimethoxysilylpropyl)urea.

Particularly good bonding performances are achieved when the following combinations of epoxysilanes and bis-silanes are used in the amounts given, wherein each amount is based on the total amount of the adhesive of the present invention:
from 0.5 to 2 wt.-% of 3-glycidyloxypropyltrimethoxysilane and from 0.15 to 1 wt.-% of bis-(trimethoxysilylpropyl)amine;
from 0.5 to 2 wt.-% of 3-glycidyloxypropyltrimethoxysilane and from 0.15 to 1 wt.-% of bis-(trimethoxysilylpropyl)urea;
from 0.5 to 2 wt.-% of 3-glycidyloxypropyltriethoxysilane and from 0.15 to 1 wt.-% of bis-(trimethoxysilylpropyl)amine;
from 0.5 to 2 wt.-% of 3-glycidyloxypropyltriethoxysilane and from 0.15 to 1 wt.-% of bis-(trimethoxysilylpropyl)urea;
from 0.5 to 2 wt.-% of 3-glycidyloxypropyltri-n-propoxysilane and from 0.15 to 1 wt.-% of bis-(trimethoxysilylpropyl)amine;
from 0.5 to 2 wt.-% of 3-glycidyloxypropyltri-n-propoxysilane and from 0.15 to 1 wt.-% of bis-(trimethoxysilylpropyl)urea;
from 0.5 to 2 wt.-% of 3-glycidyloxypropyltri-iso-propoxysilane and from 0.15 to 1 wt.-% of bis-(trimethoxysilylpropyl)amine;
from 0.5 to 2 wt.-% of 3-glycidyloxypropyltri-iso-propoxysilane and from 0.15 to 1 wt.-% of bis-(trimethoxysilylpropyl)urea.

The epoxysilane and the bis-silane used in the present invention are preferably free and mobile components of the adhesive of the present invention, which means that said silane compounds are not immobilized on a carrier material, such as a solid surface.

However, it may be desirable for specific applications that the epoxysilane and/or the bis-silane used in the present invention is/are immobilized on a carrier material, such as a solid surface.

The adhesives of the present invention can be prepared by conventional means. For ease of application, the components of the inventive adhesive can be dispersed or dissolved in a liquid carrier, such as an organic solvent or a mixture of different organic solvents. Once the adhesive has been applied the liquid carrier evaporates.

In one embodiment the adhesive of the present invention comprises at least one organic solvent as a liquid carrier. The organic solvent may comprise water or water-miscible solvents, wherein it is preferred that the amount of water in the organic solvent is less than 10 wt.-%, preferably less than 5 wt.-%, more preferably less than 1 wt.-%, and particularly preferably less than 0.1 wt.-%, each based on the total amount of the organic solvent.

Depending on the amount of water present in the organic solvent, it is possible that the epoxysilane and/or the bis-silane used in the present invention are partially or fully hydrolyzed.

Examples of suitable organic solvents include aromatic and halogenated aromatic hydrocarbons such as benzene, toluene, xylene, chlorobenzene, and dichlorobenzene; halogenated aliphatic hydrocarbons such as trichloroethylene, perchloroethylene, and propylene dichloride; ketones such as methyl ethyl ketone, and methyl isobutyl ketone; ethers, naphthas, etc., including mixtures of such solvents.

Preferred organic solvents are xylene and toluene, ortho- and para-chlorotoluene, optionally in combination with tetrachloroethylene.

The adhesive of the present invention can comprise any mixture of the aforementioned organic solvents, wherein mixtures of at least one aromatic solvent and at least one non-aromatic solvent are preferred to ensure that a dry and non-tacky film is formed. The amount of organic solvent employed is preferably in the range of about 50 to about 90 percent by weight, more preferably in the range of about 60 to about 80 percent by weight, and particularly preferably in the range of about 65 to about 75 percent by weight, each based on the total amount of the inventive adhesive.

The adhesives of the present invention may additionally comprise any additives conventionally used in adhesive formulation that are suitable for use in polymer-to-metal, for example elastomer to metal such as rubber to metal bonding applications.

Illustrative examples of such additives include reinforcing carbon blacks; fillers such as calcium carbonates, chalks, talcs, silicas or metal oxides; accelerator systems; vulcanization retarders; promoters such as zinc oxide or stearic acid; plasticizers such as aromatic, paraffinic, naphthenic and synthetic mineral oils; light-protecting agents; ozone-protecting agents; processing auxiliaries, sulfur and/or any combination thereof.

Commonly these additives may be present at a quantity of about 0.1 to about 80 percent by weight, more preferably at a quantity of about 0.1 to about 40 percent by weight, each based on the total amount of the adhesive of the present invention.

One typical formulation of the adhesive of the present invention comprises or consists of, based on the total amount of the adhesive:
i) from 1 to 30 wt.-% of at least one halogenated polyolefin;
ii) from 0.2 to 5 wt-% of at least one epoxysilane having at least one terminal alkoxy silane group;
iii) from 0.1 to 2 wt.-% of at least one bis-silane; and
iv) from 40 to 90 wt.-% of at least one organic solvent;
v) from 0 to 50 wt.-% of at least one additive.

Another typical formulation of the adhesive of the present invention comprises or consists of, based on the total amount of the adhesive:
i) from 1 to 30 wt.-% of at least one chlorinated polyolefin;
ii) from 0.2 to 5 wt.-% of at least one epoxysilane having at least one terminal alkoxy silane group selected from the group consisting of 3-glycidyloxypropyltrimethoxysilane, 3-glycidyloxypropyl-triethoxysilane, 3-glycidyloxypropyltri-n-propoxysilane, 3-glycidyloxypropyltri-iso-propoxysilane, 3-glycidyloxypropyltri-n-butoxysilane, 3-glycidyloxypropyltri-iso-butoxysilane, beta-(3,4-epoxycyclohexyl)-ethyltrimethoxysilane, beta-(3,4-epoxycyclohexyl)-ethyltriethoxysilane, beta-(3,4-epoxycyclohexyl)-ethyltri-n-propoxysilane, beta-(3,4-epoxycyclohexyl)-ethyltri-iso-propoxysilane, gamma-(3,4-epoxycyclohexyl)-propyltrimethoxysilane, gamma-(3,4-epoxycyclohexyl)-propyltriethoxysilane, gamma-(3,4-epoxycyclohexyl)-propyltri-n-propoxysilane, and gamma-(3,4-epoxycyclohexyl)-propyltri-iso-propoxysilane;
iii) from 0.1 to 2 wt.-% of at least one bis-silane; and
iv) from 40 to 90 wt.-% of at least one organic solvent;
v) from 0 to 50 wt-% of at least one additive.

A further typical formulation of the adhesive of the present invention comprises or consists of, based on the total amount of the adhesive:
i) from 1 to 30 wt.-% of at least one chlorinated polyolefin;
ii) from 0.2 to 5 wt.-% of at least one epoxysilane having at least one terminal alkoxy silane group;
iii) from 0.1 to 2 wt.-% of at least one bis-silane selected from the group consisting of bis-(trimethoxysilylethyl)amine, bis-(triethoxysilylethyl)amine, bis-(tri-n-propoxysilylethyl)amine, bis-(tri-iso-propoxysilylethyl)amine, bis-(trimethoxysilylpropyl)amine, bis-(triethoxysilylpropyl)amine, bis-(tri-n-propoxysilylpropyl)amine, bis-(tri-iso-propoxysilylpropyl)amine, bis-(trimethoxysilylethyl)urea, bis-(triethoxysilylethyl)urea, bis-(tri-n-propoxysilylethyl)urea, bis-(tri-iso-propoxysilylethyl)urea, bis-(trimethoxysilylpropyl)urea, bis-(triethoxysilylpropyl)urea, bis-(tri-n-propoxysilylpropyl)urea, and bis-(tri-iso-propoxysilylpropyl)urea;
iv) from 40 to 90 wt.-% of at least one organic solvent;
v) from 0 to 50 wt.-% of at least one additive.

Another typical formulation of the adhesive of the present invention comprises or consists of, based on the total amount of the adhesive:
i) from 1 to 30 wt.-% of at least one chlorinated polyolefin;
ii) from 0.2 to 5 wt.-% of at least one epoxysilane having at least one terminal alkoxy silane group selected from the group consisting of 3-glycidyloxypropyltrimethoxysilane, 3-glycidyloxypropyl-triethoxysilane, 3-glycidyloxypropyltri-n-propoxysilane, 3-glycidyloxypropyltri-iso-propoxysilane, 3-glycidyloxypropyltri-n-butoxysilane and 3-glycidyloxypropyltri-iso-butoxysilane;
iii) from 0.1 to 2 wt.-% of at least one bis-silane selected from bis-(trimethyoxysilylpropyl) urea and/or bis-(trimethoxysilylpropyl)amine; and
iv) from 40 to 90 wt.-% of at least one organic solvent;
v) from 0 to 50 wt.-% of at least one additive.

The adhesives of the present invention possess a number of advantages. For example, the adhesives can be formulated as one-part adhesives which are easily and conveniently applied to substrates in a standard manner. The adhesives of the present invention may also have a reduced toxicity as compared to other formulations because the inventive adhesive can be formulated without significant amounts of isocyanate-containing and/or nitroso-containing compounds.

In this context it is preferred that the adhesive of the present invention is substantially free of nitroso-containing compounds.

The term "nitroso-containing compound", as used herein, refers to any compound which comprises at least one nitroso functional group *—N=0.

The term "substantially free of nitroso-containing compounds" means that the adhesive of the present invention comprises less than 1 wt.-%, preferably less than 0.1 wt.-%, more preferably less than 0.01 wt.-%, and particularly preferably less than 0.001 wt.-% of nitroso-containing compounds, each based on the total amount of the inventive adhesive.

In another embodiment the adhesive of the present invention is totally free of nitroso-containing compounds.

In a further embodiment the adhesive of the present invention is substantially free of isocyanate-containing compounds.

The term "isocyanate-containing compound", as used herein, refers to any compound which comprises at least one isocyanate functional group *—NCO.

The term "substantially free of isocyanate-containing compounds" means that the adhesive of the present invention comprises less than 1 wt.-%, preferably less than 0.1 wt.-%, more preferably less than 0.01 wt.-%, and particularly preferably less than 0.001 wt.-% of isocyanate-containing compounds, each based on the total amount of the inventive adhesive.

It is also desirable that the total amount of all isocyanate-containing compounds and all nitroso-containing compounds is less than 1.5 wt.-%, preferably less than 0.15 wt.-%, more preferably less than 0.015 wt.-%, and particularly preferably less than 0.0015 wt.-% of nitroso-containing compounds, each based on the total amount of the inventive adhesive.

In another embodiment the adhesive of the present invention is totally free of isocyanate-containing compounds or totally free of isocyanate-containing compounds and nitroso-containing compounds.

Another advantage of the adhesives according to the present invention is that said adhesives are capable of curing to provide excellent bond strength, especially when used to bond polar elastomeric substrates, such as nitrile butadiene rubber (NBR), hydrogenated nitrile butadiene rubber (HNBR) and/or ethylene acrylic elastomers to metallic substrates.

For example, in rubber to metal bonding tests to determine the bond strength of the adhesive of the present invention 85% to 100% rubber failure was observed. Furthermore, the resultant bonds have excellent hot water resistance.

In a further aspect the present invention relates to a process for bonding a first substrate to a second substrate, comprising the steps of:
a) providing an adhesive of the present invention;
b) applying the adhesive to at least one part of the surface of the first substrate; and
c) contacting said surface of the first substrate with a surface of a second substrate, to which the adhesive is optionally applied, under conditions of heat and pressure sufficient to create an adhesive bond between the two substrates.

The first substrate and/or the second substrate may be a metallic substrate, a glass substrate or a substrate made of fabrics. Alternatively, it is possible that the first substrate and/or the second substrate comprise(s) or consist(s) of a polymeric material, such as an elastomeric material, like natural or synthetic rubber. Preferred adhesives of the present invention are one-coat adhesives which are adapted to be utilized to bond polymers, such as elastomeric materials to other substrates, such as metallic substrates without the use of a primer.

Many different substrates may be treated with the adhesive described in this invention, and may be bonded to polymers, such as elastomeric materials. These substrates include, but are not limited to, glass, fabrics and/or metals, wherein metallic substrates are particularly preferred. Preferred metallic substrates include, but are not limited to, zinc, zinc alloys such as zinc-nickel and zinc-cobalt alloys, metal substrates having zinc-containing coatings or tin-containing coatings, steel and in particular cold rolled and carbon steel, aluminum, aluminum alloys, copper, copper alloys such as brass, tin and tin alloys and/or any combination thereof. Prior to bonding, the surface of the metallic substrate is typically cleaned according to one or more methods known in the art, such as degreasing, grit-blasting and zinc-phosphatizing.

Suitable elastomeric materials can be selected from natural or synthetic rubbers. Suitable synthetic rubbers include polychloroprene, polybutadiene, neoprene, styrene-butadiene copolymer rubber, acrylonitrile-butadiene copolymer rubber, ethylene-propylene copolymer rubber, ethylene-propylene terpolymer rubber, butyl rubber, brominated butyl rubber, alkylated chlorosulfonated polyethylene, nitrile butadiene rubbers (NBR), hydrogenated nitrile butadiene rubbers (HNBR) and/or ethylene acrylic elastomers.

As noted above it is a particular advantage that the adhesives of the present invention can be used for bonding polar elastomeric materials to metallic substrates.

Therefore it is preferred that the elastomeric material or elastomeric substrate is selected from nitrile butadiene rubbers (NBR), hydrogenated nitrile butadiene rubbers (HNBR) and/or ethylene acrylic elastomers and/or any combination or mixture thereof.

In one embodiment of the process of the present invention the first substrate is a metallic substrate and/or the second substrate comprises or consists of an elastomeric material, like polar elastomeric materials, such as nitrile butadiene rubber (NBR), hydrogenated nitrile butadiene rubber (HNBR) and/or ethylene acrylic elastomers and/or any combination or mixture thereof.

In step b) of the process of the present invention the adhesive may be applied to at least one part of the surface of the first substrate, e.g., to at least one part of the metallic surface by spraying dipping, brushing, and/or wiping. After the adhesive has been applied, it is preferred that the formed coating is permitted to dry. In some cases, it may be desirable to preheat the first substrate, such as the metallic substrate prior to application of the adhesive of the present invention to assist in drying of the adhesive. Particularly durable adhesive bonds are obtained when the adhesive of the present invention is applied in an amount sufficient to form a film having a film thickness in the range of about 3 µm to about 20 µm, more preferably of about 6 µm to about 12 µm.

Than in step c) of the process of the present invention the surface of the first substrate is contacted with the surface the second substrate, to which the adhesive is optionally applied, under conditions of heat and pressure sufficient to create an adhesive bond between the two substrates.

In a preferred embodiment of the present invention the adhesive bond between the two substrates is formed in step c) of the process of the present invention by bringing the two substrates together under a pressure from about 20 MPa to about 200 MPa, preferably from about 25 MPa to 50 MPa at a temperature from about 100° C. to about 200° C., preferably from about 160° C. to about 190° C. The formed assembly should preferably remain under the applied pressure and temperature for a period of time of about 1 min to 60 min, more preferably for a period of time of about 3 min to 20 min.

The conditions of heat and pressure sufficient to create an adhesive bond between the two substrates could vary depending on the chemical composition of the adhesive of the present invention and/or depending on the vulcanization rate of the elastomeric substrate. In one embodiment of the present invention the elastomeric substrate is vulcanized concurrently with bonding to the surface of the metallic substrate in step c) of the inventive process.

In an alternative embodiment the elastomeric substrate is already vulcanized prior to the bonding process, which means that substantially no vulcanization of the elastomeric substrates occurs in step c) of the process of the present invention.

Generally, it is desirable that bonding is achieved during the vulcanization of the elastomeric substrate.

The process of the present invention may be carried out by applying an elastomeric substrate as a semi-molten material to an adhesive coated metal surface as in, for example, an injection-molding process. The process of the present invention may also be carried out by utilizing compression molding, transfer molding or autoclave curing techniques. After the process is complete, a bonded assembly is formed, in which the fully vulcanized elastomeric material is bonded to a metallic substrate by the cured product of the inventive adhesive.

Therefore, another aspect of the present invention is an article comprising at least two substrates bound together by the cured product of the adhesive of present invention.

The article of the present invention is preferably a bonded assembly which comprises at least one metallic substrate bonded to at least one elastomeric substrate by the cured product of the inventive adhesive, wherein the elastomeric substrate is preferably selected from nitrile butadiene rubber (NBR), hydrogenated nitrile butadiene rubber (HNBR) and/or ethylene acrylic elastomers.

The article or bonded assembly of the present invention is ready for use in a final application including, but not limiting to, engine mount, damper, or belting.

A further aspect of the present invention is the use of an adhesive of the present invention for bonding a first substrate to a second substrate, wherein one substrate is an elastomeric substrate.

In a preferred embodiment the adhesive of the present invention is used for bonding a metallic substrate to a polymeric substrate. More preferably the adhesive of the present invention is used for bonding a metallic substrate to an elastomeric substrate, wherein preferred elastomeric substrates are selected from polar elastomeric substrates. Suitable metallic substrates and suitable polymeric substrate, elastomeric substrates, and polar elastomeric substrates are described above.

EXAMPLES

A. Sample Preparation

The adhesive formulations were prepared by combining the listed ingredients in a solvent mixture of methoxy propyl acetate and xylene.

The metal substrates (mild steel, size of 10.2 cm×2.5 cm) were prepared by removing all surface contaminations, such as oil grease and rust. The adhesive formulations were applied on the metal surfaces at a film thickness of 8 μm using an applicator (nozzle diameter 2 mm, air pressure 3.5 bar; distance approx. 50 cm), wherein a surface area of 6.45 cm2 was covered by the adhesive. After a thin and uniform coating was formed on the metal substrates, the coated metal substrates were dried at 22° C. for 20 min.

The formed coated metal substrates were then bonded to DOTG-free Vamac or HNBR (elastomeric substrates) by injection molding the elastomeric substrates onto the coated metal substrates under a pressure of >5 MPa at a temperature of 160° C. for 12 min.

The formed assembly was cooled to 20° C. and the initial bond strength was determined as described below. By additionally exposing the aforementioned assembly to a temperature of 175° C. for 4 hours the vulcanization reaction of the elastomeric substrate was completed and the post-cured bond strength of the fully vulcanized assembly was determined as described below.

B. Test Methods

Initial Bond Strength

Bonded parts were pulled to destruction according to ASTM Test D429—Method B. Bonded parts were tested in peel with a peel angle of 45 degrees using an Instron 5567A. The tests were conducted at 22° C. with a test speed of 50 mm per minute.

Post Cured Bond Strength

After 4 hours at 175° C. the formed assembly was allowed cool to 20° C. and then the post cured bond strength was determined according to ASTM Test D429—Method B as described above.

Stressed Boiling Water Test

The formed assembly was stressed at a 90° angle using a 2 Kg weight attached to the elastomeric substrate. The stressed assembly was then placed in boiling water for an extended period to ascertain how long the assembly can withstand the conditions before failure occurs. Details of the stressed boiling water tests can be found in "Handbook of rubber bonding", Smithers Rapra Press, Bryan Crowther, chapter 3.8, pages 110-112.

C. Adhesive Formulations and Bonding Performance

In the following examples of Table 1 and 2, a number of adhesive formulations are given on a weight percent basis. The adhesive formulations were evaluated for bonding performance on polar elastomeric substrates, such as N'N-di-ortho-tolyl guanidine (DOTG)-free Vamac and HNBR.

TABLE 1

Initial and post-cured bond strengths on DOTG-free Vamac

| | Formulation (wt.- % basis) | | | |
|---|---|---|---|---|
| Ingredient | 1 | 2 | 3 | 4 |
| Halogenated polyolefin Superchlon HE1200[1] | 10 | 10 | 13 | 13 |
| Carbon black | 2.5 | 2.5 | 2.5 | 2.5 |
| Epoxysilane 3-Glycidyloxypropyltrimethoxysilane | 1 | 1.6 | 1 | 1.5 |
| Bis-silane Bis-(trimethyoxysilylpropyl)urea | 0.3 | 0.6 | 0.3 | 0.6 |
| Methoxy propyl acetate | 6 | 6 | 6 | 6 |
| Xylene | 80.2 | 79.3 | 77.2 | 76.4 |
| Initial Bond Strength (N/mm) | 22.6 | 21.9 | 20.9 | 21.0 |
| Post-cured bond strength (N/mm) | 27.2 | 27.3 | 22.9 | 30.2 |

[1]Chlorinated polyethylene

TABLE 2

Initial bond strengths and stressed boiling water tests were performed on HNBR

| | Formulation (wt.- % basis) | | |
|---|---|---|---|
| Ingredient | 6 | 7[a] | 8 |
| Halogenated polyolefin 1 Superchlon HE1200[1] | 10 | 10 | 13 |
| Carbon black | 2.5 | 2.5 | 2.5 |
| Epoxysilane 3-Glycidyloxypropyltrimethoxysilane | 1 | 1.6 | 1 |
| Bis-silane Bis(trimethyoxysilylpropyl) urea | 0.3 | — | 0.3 |
| Methoxy propyl acetate | 6 | 6 | 6 |
| Xylene | 80.2 | 79.9 | 77.2 |
| Initial Bond Strength (N/mm) | 29.5 | 11.2 | 34.4 |
| Stressed (2 Kg) boiling water test | >8 hrs | <1 hr | >8 hrs |

[1]Chlorinated polyethylene
[2]Comparative formulation

Comparative formulation 7 demonstrates that an insufficient bonding strength is obtained, when an adhesive formulation is used which does not comprise a combination of halogenated polyolefin, epoxysilane and bis-silane.

What is claimed is:

1. An article comprising an adhesive layer, comprising:
   i) at least one halogenated polyolefin having a weight average molecular weight of 200,000 to 400,000, wherein the halogen content ranges from 55 to 90 percent by weight, present in an amount in the range of 1 to 30 wt.-%, based on the weight of the adhesive;
   ii) at least one epoxysilane having at least one terminal alkoxy silane group wherein the epoxysilane is present in an amount of 0.2 to 5 wt.-%, based on the weight of the adhesive;
   iii) at least one bis-silane, wherein the bis-silane has two silicon atoms per molecule, wherein the two silicon atoms are linked with each other by a divalent linkage group and each silicon atom carries three additional substituents, wherein at least one of the three additional substituents is an alkyl or alkoxy residue, and the bis-silane is present in an amount of 0.1 to 2 wt.-%, based on the weight of the adhesive;
   iv) optionally at least one organic solvent, wherein the weight ratio of epoxysilane to bis-silane in the adhesive is from 1:0.2 to 1:0.8 wherein the adhesive layer is, disposed between (a) a polar elastomeric substrate selected from the group consisting of nitrile butadiene rubber, hydrogenated nitrile butadiene rubber and ethylene acrylic elastomers, and (b) a metallic substrate.

2. The article of claim 1, wherein the halogenated polyolefin is selected from chlorinated polyolefins.

3. The article of claim 1, wherein the epoxysilane comprises a single epoxy group and a single terminal alkoxy silane group per molecule.

4. The article of claim 1, wherein the epoxysilane is represented by formula (I)

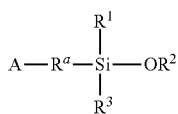

formula (I)

wherein $R^a$ is a divalent linkage group, comprising 1 to 24 carbon atoms, R and $R^3$ independently of one another are selected from $C_{1-24}$ alkyl, $C_{2-24}$ alkenyl, $C_{1-24}$ alkoxyl or $C_{3-24}$ acyl, and $R^2$ is selected from $C_{1-24}$ alkyl or $C_{3-24}$ acyl, A is either

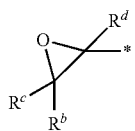

where R, $R^o$ and $R^d$ independently of one another are hydrogen or $C_{1-6}$ alkyl; or

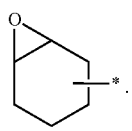

5. The article of claim 1, wherein the epoxysilane is represented by formula (II),

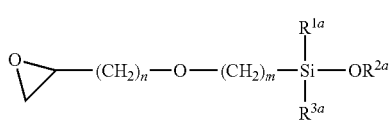

formula (II)

wherein n is an integer from 1 to 10, m is an integer from 0 to 14, $R^{1a}$ and $R^{3a}$ independently of one another are selected from $C_{1-24}$ alkyl, $C_{2-24}$ alkenyl, $C_{1-24}$ alkoxyl or $C_{3-24}$ acyl, and $R^{2a}$ is selected from $C_{1-24}$ alkyl or $C_{3-24}$ acyl; or is represented by formula (IIa),

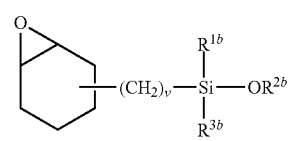

formula (IIa)

wherein v is an integer from 1 to 10, $R^{1b}$ and $R^{3b}$ independently of one another are selected from $C_{1-24}$ alkyl, $C_{2-24}$ alkenyl, $C_{1-24}$ alkoxyl or $C_{3-24}$ acyl, and $R^{2b}$ is selected from $C_{1-24}$ alkyl or $C_{3-24}$ acyl.

6. The article of claim 1, wherein the epoxysilane is selected from 3-glycidyloxypropyltrimethoxysilane, 3-glycidyloxypropyltriethoxysilane, 3-glycidyloxypropyltri-n-propoxysilane, 3-glycidyloxypropyltri-iso-propoxysilane, 3-glycidyloxypropyltri-n-butoxysilane, 3-glycidyloxypropyltri-iso-butoxysilane, beta-(3,4-epoxycyclohexyl)-ethyltrimethoxysilane, beta-(3,4-epoxycyclohexyl)-ethyltriethoxysilane, beta-(3,4-epoxycyclohexyl)-ethyltri-n-propoxysilane, beta-(3,4-epoxycyclohexyl)-ethyltri-iso-propoxysilane, gamma-(3,4-epoxycyclohexyl)-propyltrimethoxysilane, gamma-(3,4-epoxycyclohexyl)-propyltriethoxysilane, gamma-(3,4-epoxycyclohexyl)-propyltri-n-propoxysilane, gamma-(3,4-epoxycyclohexyl)-propyltri-iso-propoxysilane, and/or combinations thereof.

7. The article of claim 1, wherein the bis-silane is represented by formula (III), $$(R^5O)_{(3-q)}(R^4)_qSi\text{—}B\text{—}Si(R^6)_p(OR^7)_{(3-p)}$$ formula (III)

wherein p is 0 to 3, q is 0 to 3, B represents a divalent linkage group comprising 1 to 24 carbon atoms and at least one heteroatom selected from N, S or O, each $R^4$ and each $R^6$ is independently selected from hydrogen, halogen, $C_{1-24}$ alkyl, $C_{2-24}$ alkenyl, $C_{1-24}$ alkoxyl or $C_{3-24}$ acyl, and each $R^5$ and each $R^7$ is independently selected from $C_{1-24}$ alkyl or $C_{3-24}$ acyl.

8. The article of claim 1, wherein the bis-silane is represented by formula (IV), $$(R^{15}O)_3Si\text{—}(R^{14})_k\text{-D-}(R^{14})_k\text{—}Si(OR^{15})_3$$ formula (IV)

where k is 0 or 1, each $R^{15}$ is independently selected from $C_{1-4}$ alkyl or $C_{1-4}$ acyl, each $R^{14}$ is independently selected from $C_{1-6}$ alkylene or $C_{6-12}$ arylene, and D is selected from one of the following divalent groups:

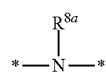

where $R^{8a}$ is selected from hydrogen, $C_{1-24}$ alkyl or $C_{6-18}$ aryl;

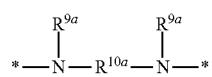

where each $R^{9a}$ is independently selected from hydrogen, $C_{1-24}$ alkyl, or $C_{6-18}$ aryl, and $R^{10a}$ is selected from $C_{1-24}$ alkylene or $C_{6-18}$ arylene;

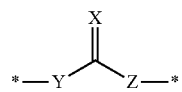

where Y is selected from O, S or $NR^{11a}$, Z is selected from O, S, and $NR^{12a}$, wherein $R^{11a}$ and $R^{12a}$ independently of one another are selected from hydrogen, $C_{1-24}$ alkyl or $C_{6-18}$ aryl, and X is the selected from O or S, with the proviso that Y and Z are not both O or S.

9. The article of claim 1, wherein the bis-silane is selected from bis-(trimethoxysilylethyl)amine, bis-(triethoxysilylethyl)amine, bis-(tri-n-propoxysilylethyl)amine, bis-(tri-iso-propoxysilylethyl)amine, bis-(trimethoxysilylpropyl)amine, bis-(triethoxysilylpropyl)amine, bis-(tri-n-propoxysilylpropyl)amine, bis-(tri-iso-propoxysilylpropyl)amine, bis-(trimethoxysilylethyl)urea, bis-(triethoxysilylethyl)urea, bis-(tri-n-propoxysilylethyl)urea, bis-(tri-iso-propoxysilylethyl)urea, bis-(trimethoxysilylpropyl)urea, bis-(triethoxysilylpropyl)urea, bis-(tri-n-propoxysilylpropyl)urea, bis-(tri-iso-propoxysilylpropyl) urea, and combinations thereof.

10. The article of claim 9, wherein the adhesive is substantially free of nitroso-containing compounds.

11. The article of claim 1, wherein the adhesive is a one-part adhesive.

* * * * *

UNITED STATES PATENT AND TRADEMARK OFFICE
CERTIFICATE OF CORRECTION

PATENT NO.         : 9,644,121 B2
APPLICATION NO.    : 13/796633
DATED              : May 9, 2017
INVENTOR(S)        : Darren Nolan et al.

It is certified that error appears in the above-identified patent and that said Letters Patent is hereby corrected as shown below:

In the Specification

Column 9, Line 18: After "is", delete "the".

Column 10, Line 2: After "is", delete "the".

Column 14, Line 6: Change "bis-(trimethyoxysilylpropyl)" to -- bis-(trimethoxysilylpropyl) --.

Column 18, Line 17 (Table 1): Change "Bis-(trimethyoxysilylpropyl)" to -- Bis-(trimethoxysilylpropyl) --.

Column 18, Line 36 (Table 2): Change "Bis-(trimethyoxysilylpropyl)" to -- Bis-(trimethoxysilylpropyl) --.

In the Claims

Column 21, Line 4: After "is", delete "the".

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*